(12) United States Patent
Lee et al.

(10) Patent No.: US 8,309,246 B2
(45) Date of Patent: Nov. 13, 2012

(54) TERMINAL OF RECHARGEABLE BATTERY AND METHOD OF MANUFACTURING THE SAME

(75) Inventors: Chiyoung Lee, Yongin-si (KR); Seokyoon Yoo, Yongin-si (KR); Joongheon Kim, Yongin-si (KR); Jongseok Moon, Yongin-si (KR)

(73) Assignee: SB Limotive Co., Ltd., Yongin-si (KR)

( * ) Notice: Subject to any disclaimer, the term of this patent is extended or adjusted under 35 U.S.C. 154(b) by 0 days.

(21) Appl. No.: 13/011,836

(22) Filed: Jan. 21, 2011

(65) Prior Publication Data
US 2011/0244317 A1 Oct. 6, 2011

Related U.S. Application Data

(60) Provisional application No. 61/406,463, filed on Oct. 25, 2010.

(51) Int. Cl.
*H01M 2/06* (2006.01)
*H01M 2/30* (2006.01)
(52) U.S. Cl. ........................................ 429/121; 429/179
(58) Field of Classification Search .................. 429/121, 429/170, 178–182
See application file for complete search history.

(56) References Cited

U.S. PATENT DOCUMENTS

| | | | | |
|---|---|---|---|---|
| 6,071,638 | A * | 6/2000 | Fradin | 429/94 |
| 7,601,457 | B2 * | 10/2009 | Byun et al. | 429/121 |
| 2009/0186269 | A1 | 7/2009 | Kim et al. | |
| 2010/0143786 | A1 | 6/2010 | Kim | |
| 2011/0244310 | A1 * | 10/2011 | Kim | 429/158 |

FOREIGN PATENT DOCUMENTS

| | | |
|---|---|---|
| EP | 2 390 942 A1 | 11/2011 |
| JP | 08-162092 | 6/1996 |
| JP | 2000-138055 A | 5/2000 |
| JP | 2001-357834 | 12/2001 |
| JP | 2009-259424 | 11/2009 |
| KR | 10-2010-0065669 A | 6/2010 |

OTHER PUBLICATIONS

Machine Translation of JP 08-162092; ; 10 pages.
Machine Translation of JP 2001-357834; 17 pages.
Extended European Search Report dated Feb. 6, 2012 for Application No. 11162794.9, 5 pages.
Machine English Translation of JP 2009-259424, 37 pages.
Japanese Office Action dated Jul. 16, 2012 issued by the Japanese Patent Office for corresponding Japanese Patent Application No. 10-2011-0008863, 4 pages.

* cited by examiner

*Primary Examiner* — Tracy Dove
(74) *Attorney, Agent, or Firm* — Christie, Parker & Hale, LLP

(57) ABSTRACT

A terminal of a rechargeable battery, which can provide a current path having reduced resistance between a bus bar and the terminal by separately forming a collector terminal and a coupling terminal while increasing a coupling force between the bus bar and the collector terminal, and a method of manufacturing the same are provided. In one embodiment, the terminal includes a collector terminal electrically connected to an electrode assembly disposed at the inside of a case and protruding toward the outside of the case, a lower fixing member having the collector terminal passing therethrough, a coupling terminal coupled to the lower fixing member in a sliding manner and protruding toward the outside of the lower fixing member, and an upper fixing member allowing the coupling terminal to pass therethrough and to be coupled thereto and covering the lower fixing member.

9 Claims, 10 Drawing Sheets

TERMINAL OF RECHARGEABLE BATTERY AND METHOD OF MANUFACTURING THE SAME

CROSS-REFERENCE TO RELATED APPLICATIONS

This application claims priority to and the benefit of U.S. Provisional Application No. 61/406,463, filed on Oct. 25, 2010 in the United States Patent and Trademark Office, the entire content of which is incorporated herein by reference.

BACKGROUND

1. Field

Aspects of embodiments according to the present invention relate to a terminal of a rechargeable battery and a method of manufacturing the same.

2. Description of Related Art

Unlike a primary battery that is not rechargeable, a secondary battery is rechargeable. Small capacity batteries—each having a single unit cell—are generally used for various portable electronic devices such as phones, laptop computers, and camcorders. Large capacity batteries—each having a plurality of unit cells—are generally used as the power source for driving motors, such as those in electric scooters, hybrid electric vehicles, or electric motor vehicles.

SUMMARY

Aspects of embodiments of the present invention are directed toward a terminal of a rechargeable battery, which can improve coupling efficiency and a coupling force by independently forming a collector terminal and a coupling terminal, and a method of manufacturing the same. Aspects of embodiments of the present invention are directed toward a terminal of a rechargeable battery, which can reduce or prevent a coupling terminal from rotating when a bus bar and a bolt are coupled to the coupling terminal by coupling the coupling terminal to a lower fixing member in a sliding manner, and a method of manufacturing the same.

In addition, aspects of embodiments of the present invention are directed toward a terminal of a rechargeable battery, which can provide a wide current path and reduce electric resistance of the terminal by transferring a current passing through a collector terminal to a bus bar through a lower fixing member having a relatively large sectional area, and a method of manufacturing the same. Further, aspects embodiments of the present invention are directed toward a terminal of a rechargeable battery, which can facilitate welding between a coupling terminal and an upper fixing member and improve welding strength by forming the coupling terminal and the upper fixing member using the same metal, and a method of manufacturing the same.

In an exemplary embodiment according to the present invention, a battery terminal of a rechargeable battery is provided. The battery terminal includes a collector terminal, a first fixing member, a coupling terminal, and a second fixing member. The collector terminal is configured to electrically couple to an electrode assembly in a case of the rechargeable battery. The first fixing member is configured to electrically and mechanically couple to the collector terminal. The coupling terminal is configured to mechanically couple to the first fixing member. The second fixing member is configured to mechanically couple to the coupling terminal.

The second fixing member may be configured to overlap the first fixing member.

The collector terminal may be configured to be riveted to the first fixing member.

The first fixing member may have a first through-hole configured to allow a portion of the collector terminal to pass through. The second fixing member may have a second through-hole configured to allow a portion of the coupling terminal to pass through.

The first fixing member may include a first planar portion having the first through-hole, first extending portions extending away from opposite sides of the first planar portion with the first through-hole therebetween, and second extending portions corresponding to and extending away from the first extending portions and towards each other with the first through-hole therebetween. The first planar portion, the first extending portions, and the second extending portions together may define a first channel.

The coupling terminal may include a body configured to couple to the first channel and a bolt portion extending away from the body.

The second fixing member may include a second planar portion having the second through-hole and third extending portions extending away from opposite sides of the second planar portion with the second through-hole therebetween. The second planar portion and the third extending portions together may define a second channel.

The body may be further configured to couple to the second channel, and be enclosed and secured in a space formed by the first channel and the second channel when the body is coupled to the first channel and to the second channel.

The third extending portions may be configured to be adjacent to corresponding opposite side surfaces of the first planar portion when the body is coupled to the first channel and to the second channel.

The first extending portions and the third extending portions may be configured to couple to four sides of the body when the body is coupled to the first channel and to the second channel.

The second fixing member may include a second planar portion having the second through-hole and third extending portions extending away from opposite sides of the second planar portion with the second through-hole therebetween. The second planar portion and the third extending portions together may define a second channel.

The coupling terminal may include a body configured to couple to the second channel and a bolt portion extending away from the body.

The bolt portion may be configured to be welded to the second planar portion.

The coupling terminal may be configured to be welded to the second fixing member.

The second fixing member may be configured to secure the coupling terminal to the first fixing member.

The collector terminal may be configured to transfer a current from the electrode assembly to a bus bar through the first fixing member.

The first fixing member may be configured to transfer the current to the bus bar through a contact area of the bus bar and the first fixing member that is larger than a contact area of the collector terminal and the first fixing member.

The coupling terminal and the second fixing member may include identical metal material.

The first fixing member and the second fixing member may have different heights.

The first fixing member may have a height higher than that of the second fixing member.

Aspects of the present invention are directed toward a terminal of a rechargeable battery including a collector terminal electrically connected to an electrode assembly disposed at the inside of a case and protruding toward the outside of the case, a lower fixing member having the collector terminal passing therethrough, a coupling terminal coupled to the lower fixing member in a sliding manner and protruding toward the outside of the lower fixing member, and an upper fixing member allowing the coupling terminal to pass therethrough and to be coupled thereto and covering the lower fixing member.

The collector terminal may pass through the lower fixing member and is then riveted.

The lower fixing member may include a planar portion having a throughhole allowing the collector terminal to pass through and to be coupled thereto, a vertically folded portion folded in a substantially upward vertical direction from opposite sides of the planar portion, and a horizontally folded portion folded in a substantially inward horizontal direction from the vertically folded portion.

The coupling terminal may include a body coupled to a space formed by the planar portion in a sliding manner, the vertically folded portion and the horizontally folded portion of the lower fixing member, and a bolt portion protruding from the body and upwardly extending.

The upper fixing member may include a planar portion having a throughhole allowing a bolt portion of the coupling terminal to pass therethrough and to be coupled thereto, and a vertically folded portion folded and extending in a substantially downward vertical direction from opposite sides of the planar portion.

The planar portion of the upper fixing member and the bolt portion of the coupling terminal may be welded to each other.

The vertically folded portion of the upper fixing member may be closely adhered to a side surface of the planar portion of the lower fixing member.

The vertically folded portion of the upper fixing member and the vertically folded portion of the lower fixing member may not overlap each other.

The upper fixing member helps prevent the coupling terminal from shifting with respect to the lower fixing member.

As described above, according to embodiments of the present invention, since a collector terminal and a coupling terminal are independently formed, coupling efficiency and a coupling force can be improved. In addition, according to embodiments of the present invention, since a coupling terminal is coupled to a lower fixing member in a sliding manner, it is possible to reduce or prevent the coupling terminal from rotating when a bus bar and a bolt are coupled to the coupling terminal.

Further, according to the embodiments of the present invention, since a current passing through a collector terminal is transferred to a bus bar through a lower fixing member having a relatively large sectional area, a wide current path can be provided and electric resistance of the terminal can be reduced. In addition, according to embodiments of the present invention, since a coupling terminal and an upper fixing member are formed using the same metal, welding between the coupling terminal and the upper fixing member can be facilitated and welding strength can be improved.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

Figure 1:
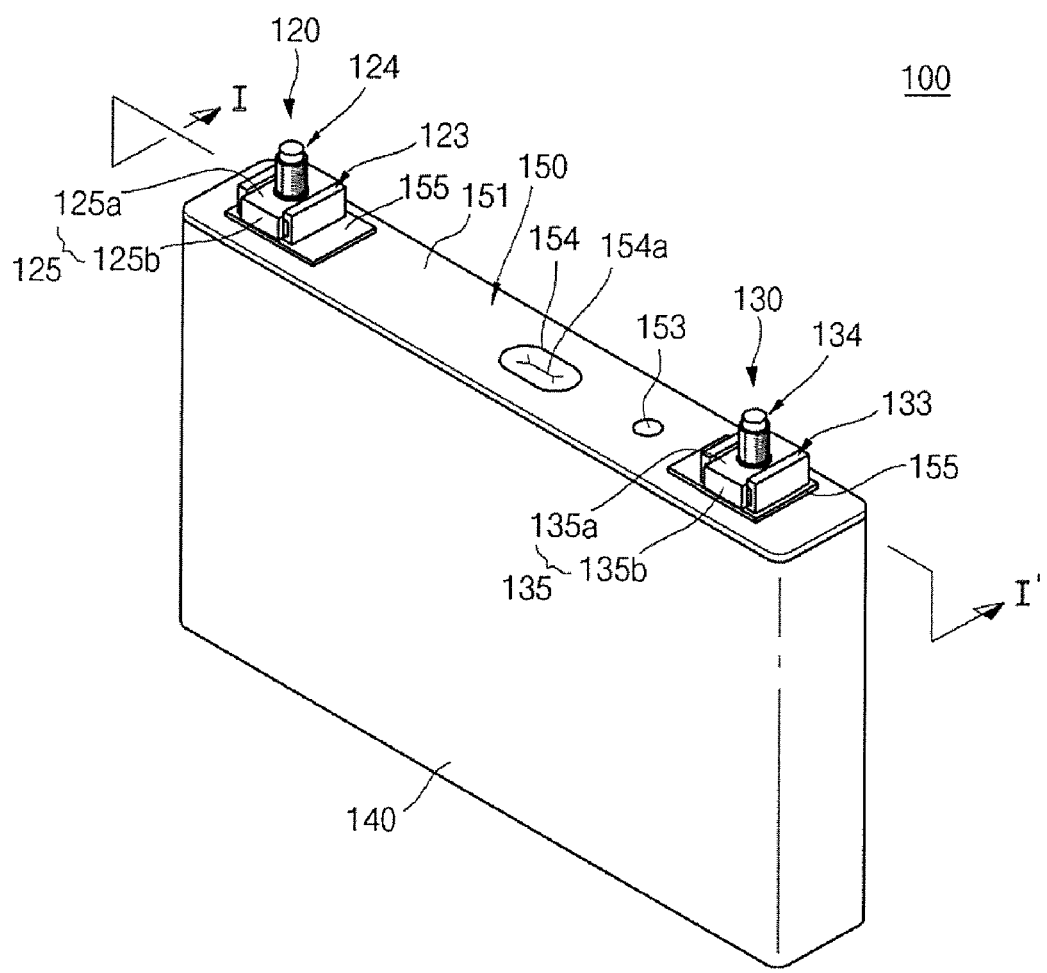
FIG. 1 is a perspective view of a rechargeable battery according to an embodiment of the present invention.

Hereinafter, examples of embodiments of the invention will be described in more detail with reference to the accompanying drawings such that they can be made and used by those skilled in the art. For ease of description, when referring to the drawings, "up" (and related concepts such as "height") is in the direction represented by the top of the page, though embodiments of the invention are not limited thereto. In the drawings, like reference numerals refer to like elements throughout.

Rechargeable batteries are manufactured in various shapes, for example, cylindrical and prismatic. The rechargeable battery may be constructed by injecting an electrolyte in a can that serves as a case and that contains an electrode assembly including a positive electrode plate, a negative electrode plate, and a separator serving as an insulator interposed therebetween, and installing a cap plate on the case. A positive electrode terminal and a negative electrode terminal are connected to the electrode assembly, which is then exposed or protruded to the outside through the cap plate.

Figure 2:
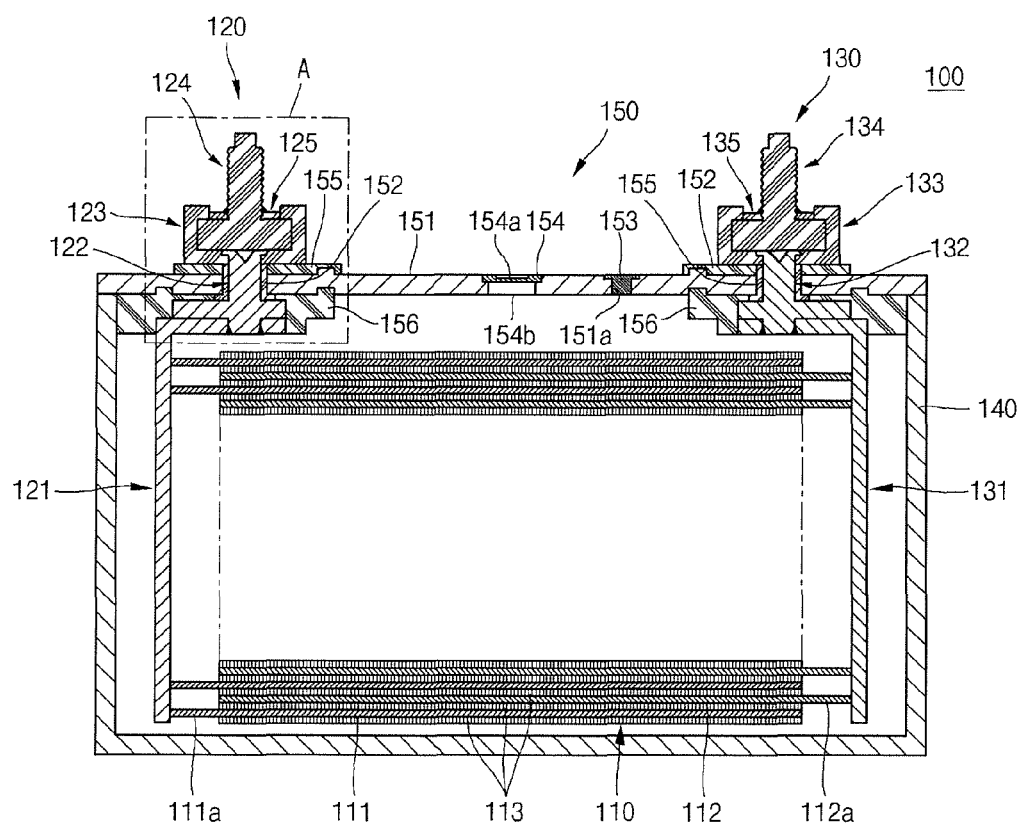
FIG. 2 is a cross-sectional view of the rechargeable battery of FIG. 1, taken along the line I-I'.
Figure 3:
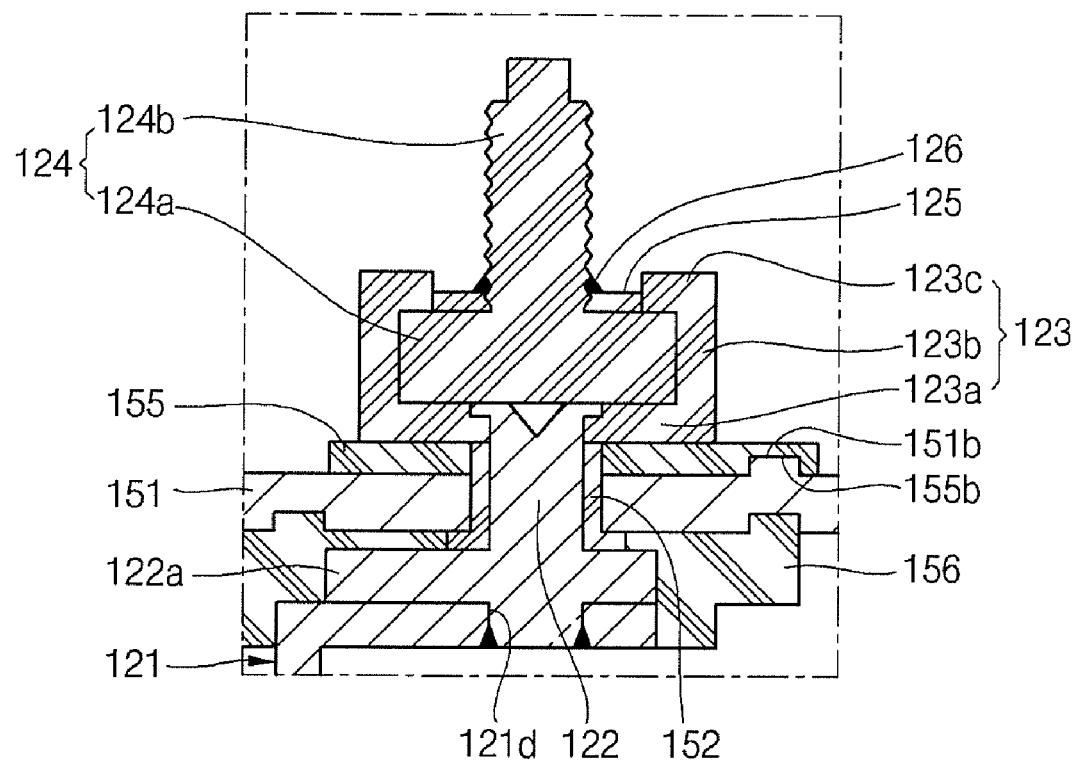
FIG. 3 is an enlarged cross-sectional view of a portion 'A' shown in FIG. 2.

FIG. 1 is a perspective view of a rechargeable battery 100 according to an embodiment of the present invention. FIG. 2 is a cross-sectional view of the rechargeable battery 100 of FIG. 1, taken along the line I-I'. FIG. 3 is an enlarged cross-sectional view of a portion 'A' shown in FIG. 2. As shown in FIGS. 1 through 3, the rechargeable battery 100 includes an electrode assembly 110, a first terminal 120, a second terminal 130, a case 140, and a cap assembly 150.

The electrode assembly 110 is formed by winding or laminating a stacked structure including a first electrode plate 111 in the shape of a thin plate or layer, a separator 113, and a second electrode plate 112. Here, the first electrode plate 111 may act as a negative electrode, and the second electrode plate 112 may act as a positive electrode, and vice versa.

The first electrode plate 111 is formed by coating a first electrode active material such as graphite or carbon on a first electrode collector formed of a metal foil such as copper or nickel, and includes a first electrode uncoated portion 111a that is not coated with the first electrode active material. The first electrode uncoated portion 111a becomes a path of a current flowing between the first electrode plate 111 and the outside of the first electrode plate 111. However, the material of the first electrode plate 111 is not limited to the example materials illustrated herein.

The second electrode plate 112 is formed by coating a second electrode active material such as a transition metal oxide on a second electrode collector formed of a metal foil such as aluminum, and includes a second electrode uncoated portion 112a that is not coated with the second electrode active material. The second electrode uncoated portion 112a becomes a path of a current flowing between the second electrode plate 112 and the outside of the second electrode plate 112. However, the material of the second electrode plate 112 is not limited to the example materials illustrated herein.

In another embodiment, polarities of the aforementioned first and second electrode plates 111 and 112 may be reversed.

The separator 113, disposed between the first electrode plate 111 and the second electrode plate 112, serves to reduce or prevent electrical shorts while allowing passage to lithium ions. The separator 113 may be made of polyethylene, polypropylene, or a composite film of polyethylene and polypropylene. However, the material of the separator 113 is not limited to the example materials illustrated herein.

The first terminal 120 and the second terminal 130 are electrically connected to the first electrode plate 111 and the second electrode plate 112, respectively. The first terminal 120 and the second terminal 130 are coupled to both ends of the electrode assembly 110.

The electrode assembly 110 is housed in the case 140 together with an electrolyte. The electrolyte may include an organic solvent such as EC (ethylene carbonate), PC (propylene carbonate), DEC (diethyl carbonate), EMC (ethyl methyl carbonate), or DMC (dimethyl carbonate), and a lithium salt such as $LiPF_6$ or $LiBF_4$. In addition, the electrolyte may be in a liquid, solid, or gel phase.

The first terminal 120 may be generally made of a metal or equivalents thereof, and is electrically connected to the first electrode plate 111. The first terminal 120 includes a first collector plate 121, a first collector terminal 122, a first lower fixing member 123, a first coupling terminal 124, and a first upper fixing member 125.

The first collector plate 121 contacts the first electrode uncoated portion 111a protruding toward one end of the electrode assembly 110. In one embodiment, the first collector plate 121 is welded to the first electrode uncoated portion 111a. The first collector plate 121 is formed in a substantially rotated 'L' shape, and has a terminal hole 121d formed at its top surface. The first collector terminal 122 is fitted into the terminal hole 121d to be engaged. The first collector plate 121 is made of, for example, copper or a copper alloy, but aspects of the present invention does not limit the material of the first collector plate 121 to those listed herein.

The first collector terminal 122 passes through a cap plate 151 to be described later and protrudes and extends to have a length (for example, a predetermined length) upwardly. In addition, the first collector terminal 122 is electrically connected to the first collector plate 121 under the cap plate 151. The first collector terminal 122 protrudes and extends to have a length (for example, a predetermined length) upwardly from the cap plate 151, and includes a laterally extending flange 122a formed under the cap plate 151 to reduce or prevent the first collector terminal 122 from shifting or moving with respect to the cap plate 151.

A portion of the first collector terminal 122, which is formed below the flange 122a, is fitted into a first terminal hole 121d of the first collector plate 121 to then be welded. In addition, a portion of the first collector terminal 122, which is formed above the flange 122a, is fixed to the first lower fixing member 123. That is, a top end of the first collector terminal 122 is coupled to the first lower fixing member 123 to be described later and is then riveted. Here, the first collector terminal 122 is electrically insulated from the cap plate 151. The first collector terminal 122 may be made of, for example, at least one selected from copper, a copper alloy, and equivalents thereof, but aspects of the present invention do not limit the material of the first collector terminal 122 to those listed herein.

The first lower fixing member 123 includes a first planar portion 123a, a first vertically folded portion 123b, and a first horizontally folded portion 123c. The first planar portion 123a has a first throughhole 123d (see FIG. 4C) allowing the first collector terminal 122 to pass therethrough and to be coupled thereto. The first vertically folded portion 123b is folded in a substantially upward vertical direction and extends from opposite sides of the first planar portion 123a. In addition, the first horizontally folded portion 123c is folded in a substantially inward horizontal direction and extends from ends of the first vertically folded portion 123b.

Therefore, the first lower fixing member 123 is formed in a substantially 'U' shape by the first planar portion 123a, the first vertically folded portion 123b, and the first horizontally folded portion 123c, forming a channel or space (for example, a predetermined space) therein. As described above, the first collector terminal 122 is coupled to the first throughhole 123d (see FIG. 4C) of the first planar portion 123a and a top end thereof is then riveted. Therefore, the first collector terminal 122 and the first lower fixing member 123 are firmly coupled to each other both electrically and mechanically. Meanwhile, the first lower fixing member 123 may be made of at least one selected from stainless steel, copper, a copper alloy, aluminum, an aluminum alloy, and equivalents thereof, but aspects of the present invention do not limit the material of the first lower fixing member 123 to those listed herein. In addition, the first lower fixing member 123 and the cap plate 151 are insulated from each other (for example, by upper insulation member 155).

The first coupling terminal 124 includes a body 124a and a bolt portion 124b. The body 124a is coupled (in, for example, a sliding manner) to the space formed by the first planar portion 123a, the first vertically folded portion 123b, and the first horizontally folded portion 123c of the first lower fixing member 123. The body 124a has a substantially hexahedral shape. Therefore, the body 124a is both electrically and mechanically coupled to the first collector terminal 122 and the first lower fixing member 123. In addition, since the first lower fixing member 123 is formed in two directions in which the first vertically folded portion 123b and the first horizontally folded portion 123c are opposite to each other, the body 124a is also restricted by the first lower fixing member 123 in two opposite directions.

The bolt portion 124b protrudes and extends to have a length (for example, a predetermined length) upwardly from the body 124a, and includes a plurality of threads formed on its surface. The first coupling terminal 124 may generally be made of at least one selected from stainless steel, aluminum, an aluminum alloy, copper, a copper alloy, and equivalents thereof, but aspects of the present invention do not limit the material of the first coupling terminal 124 to those listed herein.

Referring back to FIG. 1, the first upper fixing member 125 includes a first planar portion 125a and a first vertically folded portion 125b. The first planar portion 125a has a throughhole 125d (see FIG. 4E) allowing the bolt portion 124b of the first coupling terminal 124 to pass therethrough and to be coupled thereto. The first vertically folded portion 125b is folded in a substantially downward vertical direction from both ends of the first planar portion 125a. Therefore, the first planar portion 125a and the first vertically folded portion 125b are formed in a substantially inverted 'U' shape, forming a channel or space (for example, a predetermined space) therein.

In addition, the first vertically folded portion 125b is closely adhered to the body 124a of the first coupling terminal 124 and the first planar portion 123a of the first lower fixing member 123. That is, the first vertically folded portion 125b of the first upper fixing member 125 and the first vertically folded portion 123b of the first lower fixing member 123 do not overlap each other. In other words, the first vertically folded portion 125b of the first upper fixing member 125 is formed at two facing sides among four sides, and the first vertically folded portion 123b of the first lower fixing member 123 is formed at the other two facing sides. Further, the first vertically folded portion 125b of the first upper fixing member 125 extends past opposite side surfaces of the body 124a and is adjacent to opposite side surfaces of first planar portion 123a of the first lower fixing member 123 (to further secure the first coupling terminal 124 to the first lower fixing member 123). In such a manner, the first coupling terminal 124 is entirely restricted by the first lower fixing member 123 and the first upper fixing member 125.

In addition, the first planar portion 125a of the first upper fixing member 125 and the bolt portion 124b of the first coupling terminal 124 may be welded to each other. In the drawing, reference numeral 126 denotes a welded portion. The first upper fixing member 125 may generally be made of at least one selected from stainless steel, aluminum, an aluminum alloy, copper, a copper alloy, and equivalents thereof, but aspects of the present invention do not limit the material of the first upper fixing member 125 to those listed herein. In addition, the first upper fixing member 125 may be made of a same material as the first coupling terminal 124. When the first coupling terminal 124 and the first upper fixing member 125 are made of the same material and welded to each other, the welding is easily performed, and welding quality and welding strength are excellent.

The second terminal 130 is also made of a metal or equivalents thereof, and is electrically connected to the second electrode plate 112. The second terminal 130 includes a second collector plate 131, a second collector terminal 132, a second lower fixing member 133, a second coupling terminal 134, and a second upper fixing member 135. Since the second terminal 130 may have the same shape as the first terminal 130, an explanation of their shapes will not be repeated.

The second collector plate 131 and the second collector terminal 132 are generally made of aluminum or an aluminum alloy, but aspects of the present invention do not limit the materials of the second collector plate 131 and the second collector terminal 132 to those listed herein. In addition, the second lower fixing member 133, the second coupling terminal 134 and the second upper fixing member 135 may be made of at least one selected from stainless steel, aluminum, an aluminum alloy, and equivalents thereof, but aspects of the present invention do not limit the materials of the second lower fixing member 133, the second coupling terminal 134 and the second upper fixing member 135 to those listed herein.

In addition, the second lower fixing member 133 and the cap plate 151 may be electrically connected to each other, and the case 140, which will be below described, may have the same polarity with the second terminal 130 (for example, a positive polarity).

As described above, according to the illustrated embodiment of FIGS. 1-3, the collector terminal 122, 132 and the coupling terminal 124, 134 are separately formed, and the collector terminal 122, 132 that collects electricity from the electrode assembly, and the coupling terminal 124, 134 mechanically coupled with a bus bar, are separately provided. Therefore, the collecting efficiency and coupling force of the rechargeable battery can both be improved. In addition, even if the collector terminal 122, 132 and the coupling terminal 124, 134 are separately formed, they have the same center axis. Therefore, widths of the first and second terminals 120 and 130 can be relatively small.

Further, in one embodiment of the present invention, since the coupling terminal 124, 134 is entirely restricted by the lower fixing member 123, 133 having a substantially 'U' shape and the upper fixing member 125, 135 having a substantially inverted 'U' shape, the coupling terminal 124, 134 is not rotated when the coupling terminal 124, 134 is coupled with a bus bar and a nut is tightened. Therefore, the nut may be tightened in the coupling terminal 124, 134 using a large torque, thereby improving a coupling force between the bus bar and the coupling terminal 124, 134.

Moreover, in one embodiment of the present invention, since the current flowing through the collector terminal 122, 132 is transferred to the bus bar through the lower fixing member 123, 133 having a relatively large sectional area (see, for example, FIG. 6), a current path becomes enlarged and electrical resistance of the terminal 120, 130 is reduced accordingly. For example, the lower fixing member 123 and the upper fixing member 125 may have different heights.

Meanwhile, the case 140 is made of a conductive metal such as aluminum, an aluminum alloy, or nickel plated steel, and has a substantially hexahedral shape having an opening in which the electrode assembly 110, the first terminal 120 and the second terminal 130 are inserted and seated. Since FIG. 2 shows that the case 140 is coupled to the cap assembly 150, the opening is not illustrated in FIG. 2. However, the opening is a substantially opened portion of the periphery of the cap assembly 150. The interior surface of the case 140 is insulated, so that the case 140 can be insulated from the electrode assembly 110, the first terminal 120, the second terminal 130 and the cap assembly 150.

The cap assembly 150 is coupled to the case 140. In more detail, the cap assembly 150 includes a cap plate 151, a seal gasket 152, a plug 153, a safety vent 154, an upper insulation member 155, and a lower insulation member 156. The seal gasket 152, the upper insulation member 155, and the lower insulation member 156 may also be components of the first terminal 120 and the second terminal 130.

The cap plate 151 seals an opening of the case 140 and may be made of the same material as the case 140. For example, the cap plate 151 may be coupled to the case 140 by laser welding. As described above, since the cap plate 151 may have the same polarity as the second terminal 130, the cap plate 151 and the case 140 may have the same polarity.

The seal gasket 152 is formed between the cap plate 151 and each of the first collector terminal 122 and the second collector terminal 132 using an insulating material, and seals regions therebetween. The seal gasket 152 reduces or prevents external moisture from permeating into the rechargeable battery 100, or the electrolyte contained in the rechargeable battery 100 from flowing out.

The plug 153 seals an electrolyte injection hole 151a of the cap plate 151. The safety vent 154 is installed in a vent hole 154b of the cap plate 151. A notch 154a may be formed to be openable at a pressure (for example, a predetermined pressure).

The upper insulation member 155 is formed between each of the first lower fixing member 123 and the second lower fixing member 133, and the cap plate 151. In addition, the upper insulation member 155 is closely adhered to the cap plate 151. Moreover, the upper insulation member 155 may also be closely adhered to the seal gasket 152. The upper insulation member 155 insulates each of the first lower fixing member 123 and the second lower fixing member 133 from the cap plate 151.

The lower insulation member 156 is formed between each of the first collector plate 121 and the second collector plate 131, and the cap plate 151, and reduces or prevents unintended electrical shorts. That is, the lower insulation member 156 reduces or prevents an electrical short between the first collector plate 121 and the cap plate 151, and an electrical short between the second collector plate 131 and the cap plate 151. In addition, the lower insulation member 156 is formed between the cap plate 151 and each of the first collector terminal 122 and the second collector terminal 132, thereby reducing or preventing unintended electrical shorts between the cap plate 151 and each of the first collector terminal 122 and the second collector terminal 132.

FIGS. 4A through 4F illustrate sequential processing steps of a method of manufacturing a terminal of a rechargeable battery according to an embodiment of the present invention. Since the second terminal 130 can have substantially the same shape as the first terminal 120, the method of manufacturing the terminal of a rechargeable battery according to an embodiment of the present invention will be described with regard to the first terminal 120 in the following description.

Figure 4A:
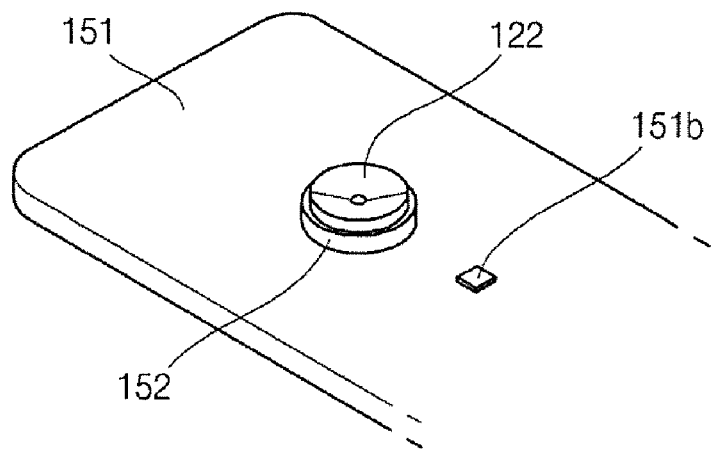
FIGS. 4A through 4F illustrate sequential processing steps of a method of manufacturing a terminal of a rechargeable battery according to an embodiment of the present invention.

As shown in FIG. 4A, the first collector terminal 122 is coupled to the cap plate 151. The first collector terminal 122 is electrically insulated from the cap plate 151 by a seal gasket 152. Here, a protrusion 151b is formed on a surface of the cap plate 151, and the protrusion 151b is engaged with an upper insulation member 155 to be described later.

Figure 4B:
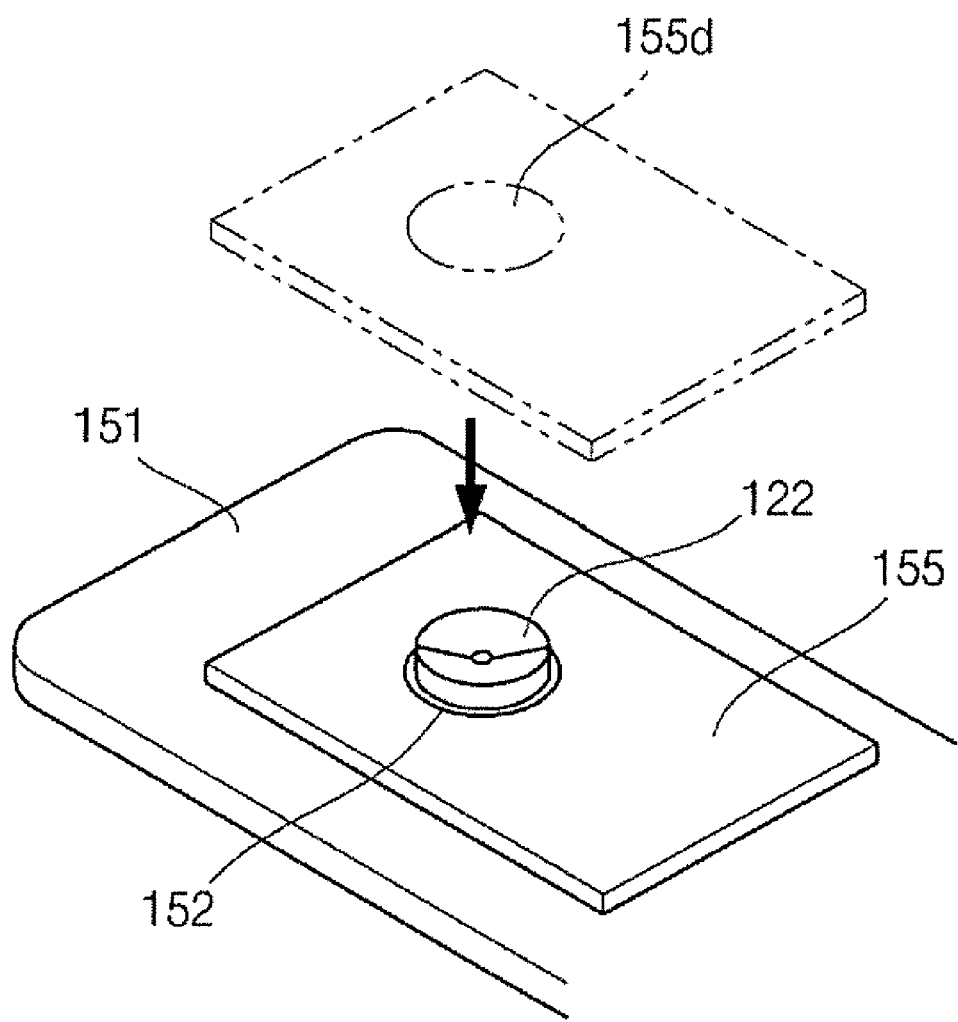

As shown in FIG. 4B, upper insulation member 155 is coupled to the first collector terminal 122. In other words, a throughhole 155d is formed in the upper insulation member 155, and the first collector terminal 122 passes through the throughhole 155d and is coupled thereto. The upper insulation member 155 is seated on the cap plate 151 and is coupled to the protrusion 151b (see FIG. 4A). Thus, the upper insulation member 155 does not rotate about the first collector terminal 122. In addition, the first collector terminal 122 still passes through the upper insulation member 155 and upwardly extends to have a length (for example, a predetermined length).

Figure 4C:
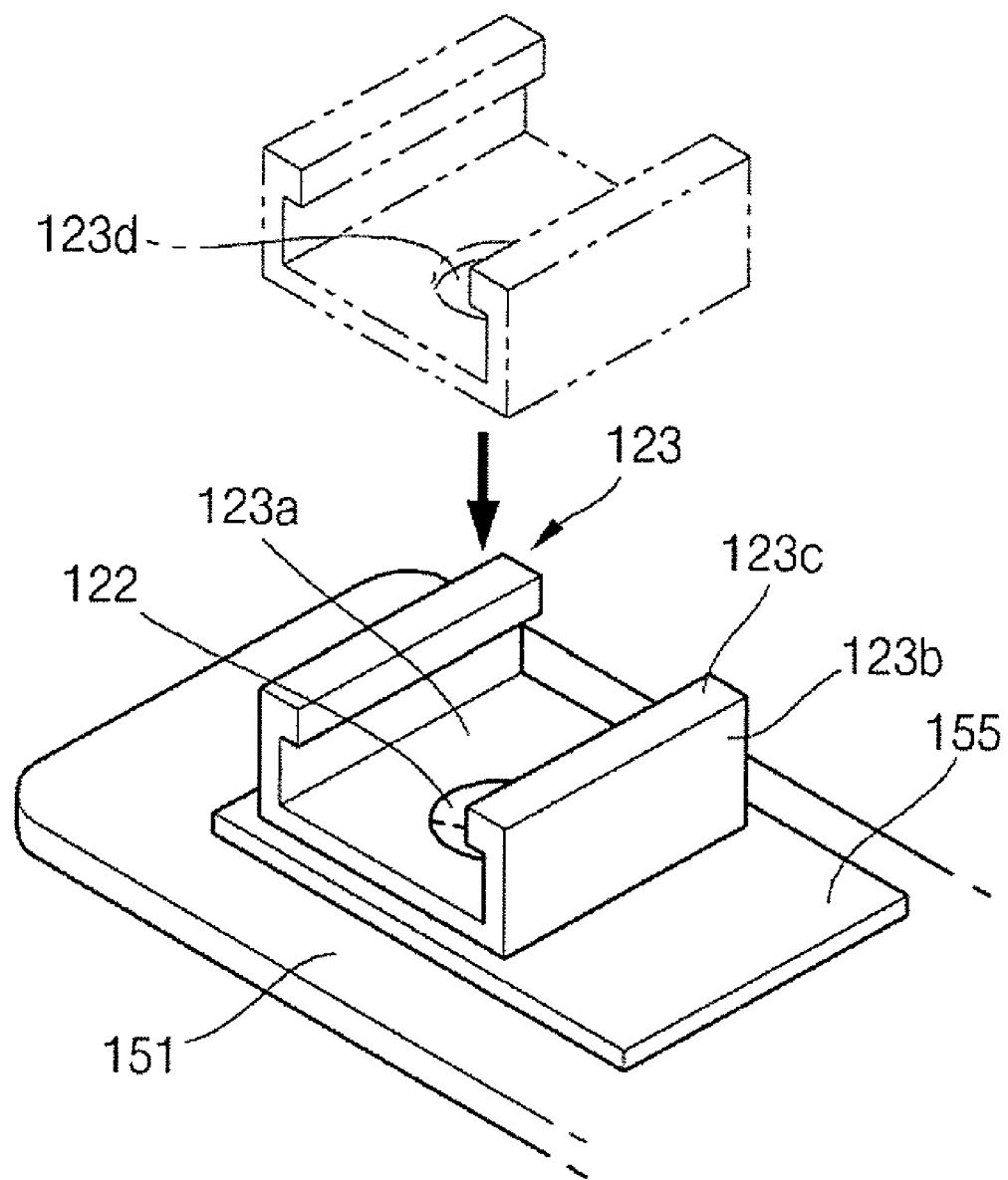

As shown in FIG. 4C, the first lower fixing member 123 formed in a substantially "U" shape is coupled to the first collector terminal 122. In other words, a throughhole 123d is formed in the first planar portion 123a of the first lower fixing member 123, and the first collector terminal 122 passes through the throughhole 123d and is coupled thereto. Here, the first planar portion 123a of the first lower fixing member 123 is closely adhered to the upper insulation member 155. Thus, the first lower fixing member 123 and the cap plate 151 are electrically insulated from each other.

In addition, a top end of the first collector terminal 122 is riveted by a riveting tool. Therefore, the top end of the first collector terminal 122 is firmly fixed to a first planar portion 123a of the first lower fixing member 123 both electrically and mechanically. Here, the first lower fixing member 123 includes a first vertically folded portion 123b folded in a substantially upward vertical direction from both (for example, opposite) sides of the first planar portion 123a, and a first horizontally folded portion 123c folded in a substantially inward horizontal direction and from the first vertically folded portion 123b. Therefore, the first lower fixing member 123 is formed in a substantially "U" shape by the first planar portion 123a, the first vertically folded portion 123b and the first horizontally folded portion 123c, forming a channel or space (for example, a predetermined space) therein. In addition, the predetermined space is open back and forth as well as left and right. Therefore, the first coupling terminal 124 (to be described later) may be coupled to the first lower fixing member 123 in a sliding manner.

Figure 4D:
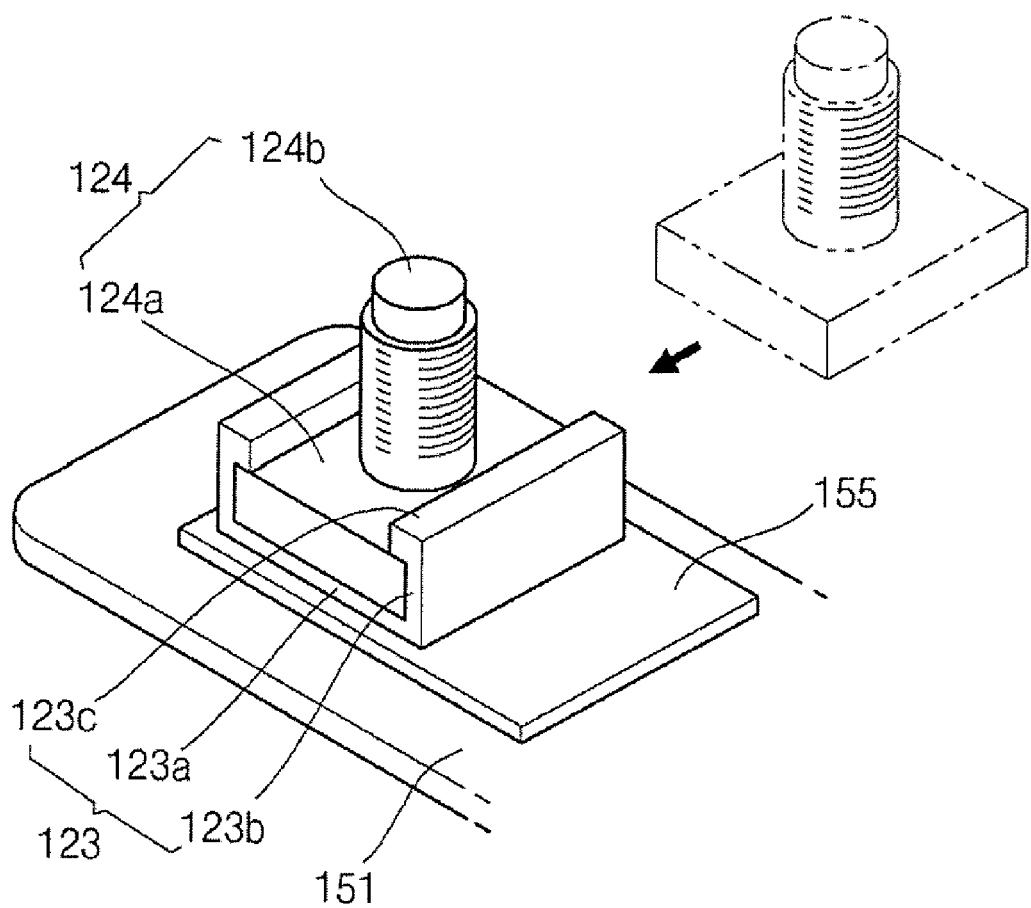

As shown in FIG. 4D, the first coupling terminal 124 is coupled to the first lower fixing member 123 in the sliding manner. That is, the first coupling terminal 124 is slidably coupled in a lateral direction to the predetermined space formed by the first planar portion 123a, the first vertically folded portion 123b and the first horizontally folded portion 123c of the first lower fixing member 123. Here, the first coupling terminal 124 includes a body 124a and a bolt portion 124b. In practice, the body 124a is coupled to the first lower fixing member 123. In addition, the bolt portion 124b protrudes to have a length (for example, a predetermined length) toward an upper portion of the first lower fixing member 123 (and away from the body 124a).

Figure 4E:
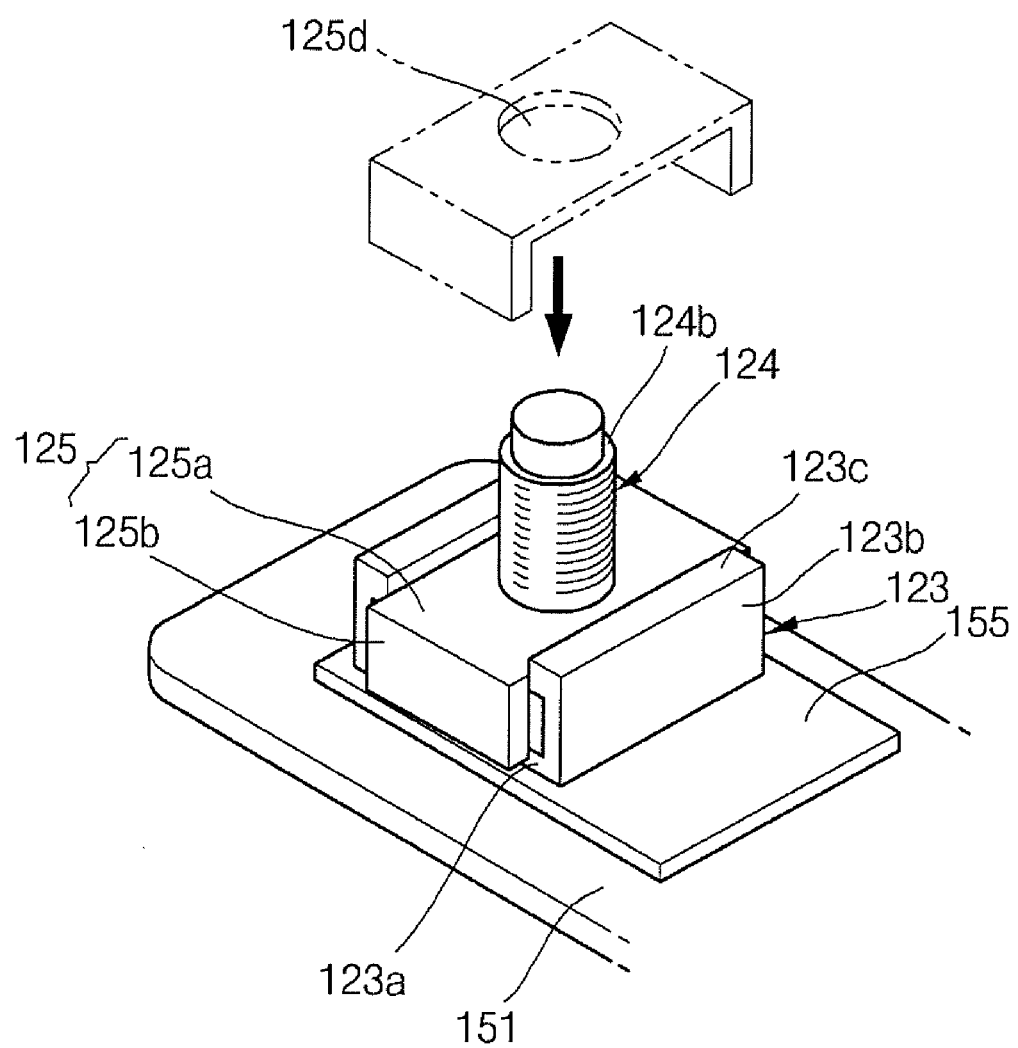

As shown in FIG. 4E, the first upper fixing member 125 formed in a substantially inverted "U" shape is coupled to the first coupling terminal 124. That is, the bolt portion 124b of the first coupling terminal 124 is coupled to the throughhole 125d formed in the first planar portion 125a of the first upper fixing member 125. In addition, the first upper fixing member 125 includes a first vertically folded portion 125b folded in a substantially downward vertical direction from the first planar portion 125a. The first planar portion 125a and the first vertically folded portion 125b roughly cover the exposed portion of the body 124a of the first coupling terminal 124. Further, the first vertically folded portion 125b of the first upper fixing member 125 also covers the first planar portion 123a of the first lower fixing member 123. In such a manner, the first coupling terminal 124, specifically, the body 124a, is entirely restricted by the first lower fixing member 123 and the first upper fixing member 125 and is not rotated by an external force.

Figure 4F:
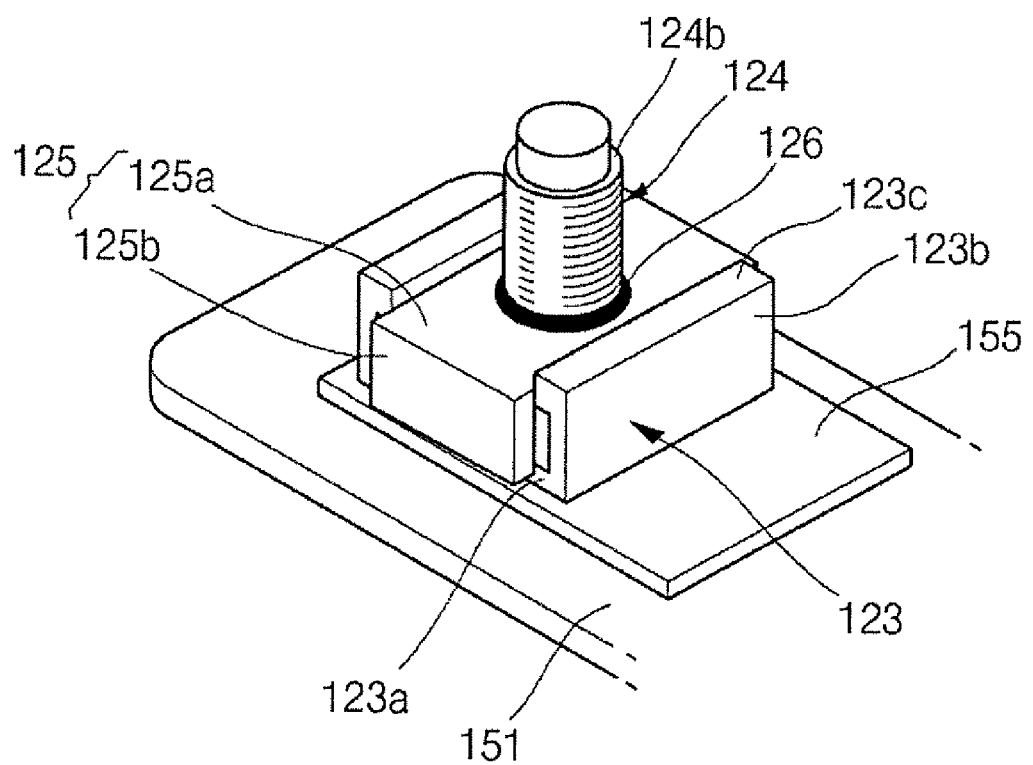

As shown in FIG. 4F, the bolt portion 124b of the first coupling terminal 124 and the first planar portion 125a of the first upper fixing member 125 are fixedly welded to each other at welded portion 126 using a welding tool. Here, since the first coupling terminal 124 and the first upper fixing member 125 are made of the same metal, they are easily welded to each other and the welding strength therebetween is excellent. In addition, since the body 124a of the first coupling terminal 124 is entirely restricted by the first lower fixing member 123 and the first upper fixing member 125, the welding process shown in FIG. 4F may be omitted or may be performed on a smaller region between the first coupling terminal 124 and the first upper fixing member 125.

Figure 5:
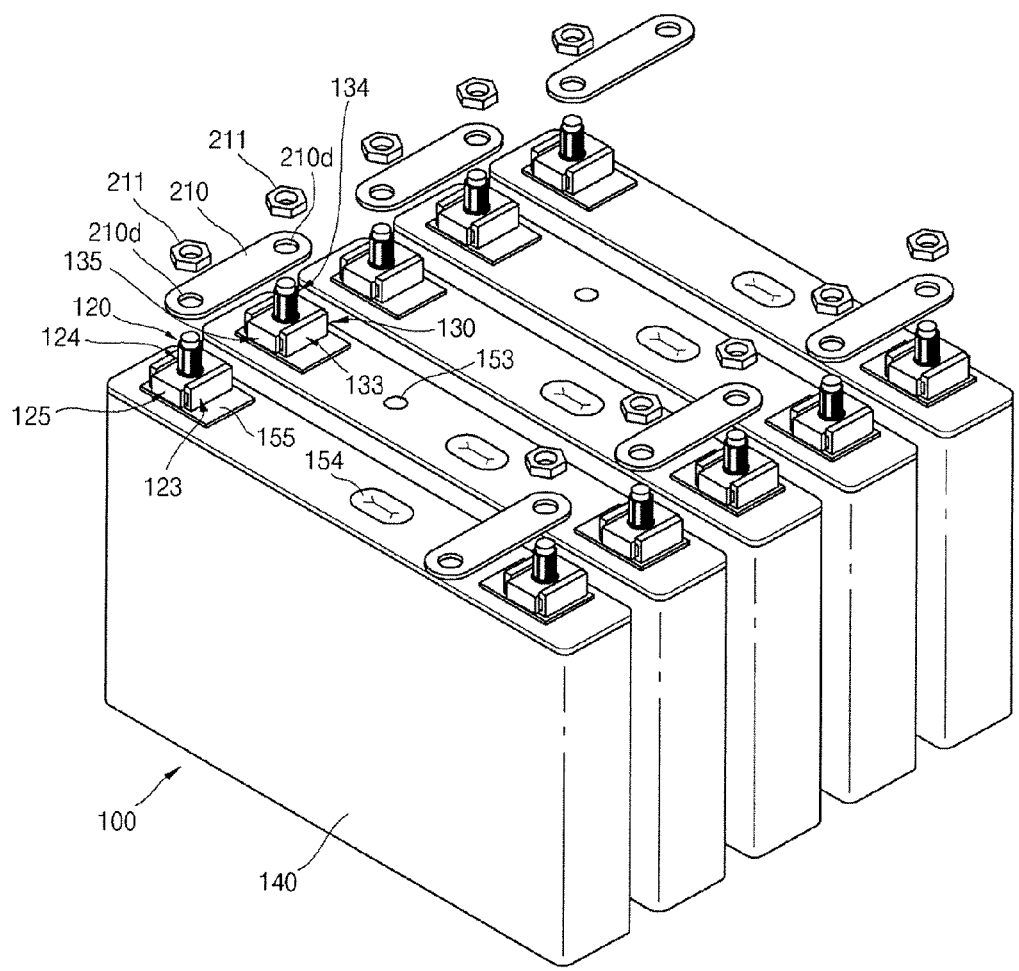
FIG. 5 illustrates a method of coupling a bus bar and a rechargeable battery according to an embodiment of the present invention.

FIG. 5 illustrates a method of coupling a bus bar and a rechargeable battery according to an embodiment of the present invention.

As shown in FIG. 5, a plurality of rechargeable batteries 100 may be connected in series and/or parallel by a conductive bus bar 210. Here, throughholes 210d are formed at both (e.g., opposite) sides of the bus bar 210. Further, the first coupling terminal 124 and the second coupling terminal 134 provided in each of the plurality of rechargeable batteries 100 are coupled to the throughholes 210d. In addition, nuts 211 are coupled to the first coupling terminal 124 and the second coupling terminal 134 passing through the bus bar 210 with a large torque. Therefore, the bus bar 210 is firmly adhered to the first and second lower fixing members 123 and 133 while being coupled to the first coupling terminal 124 or the second coupling terminal 134 using the nuts 211.

In such a manner, since the bus bar 210 is firmly coupled to the coupling terminal 124, 134 using nuts, a coupling force between the bus bar 210 and the coupling terminal 124, 134 can be enhanced. In addition, a relatively large current path is formed through the collector terminal, the lower fixing member and the bus bar, thereby reducing the electrical resistance of the terminal.

Figure 6:
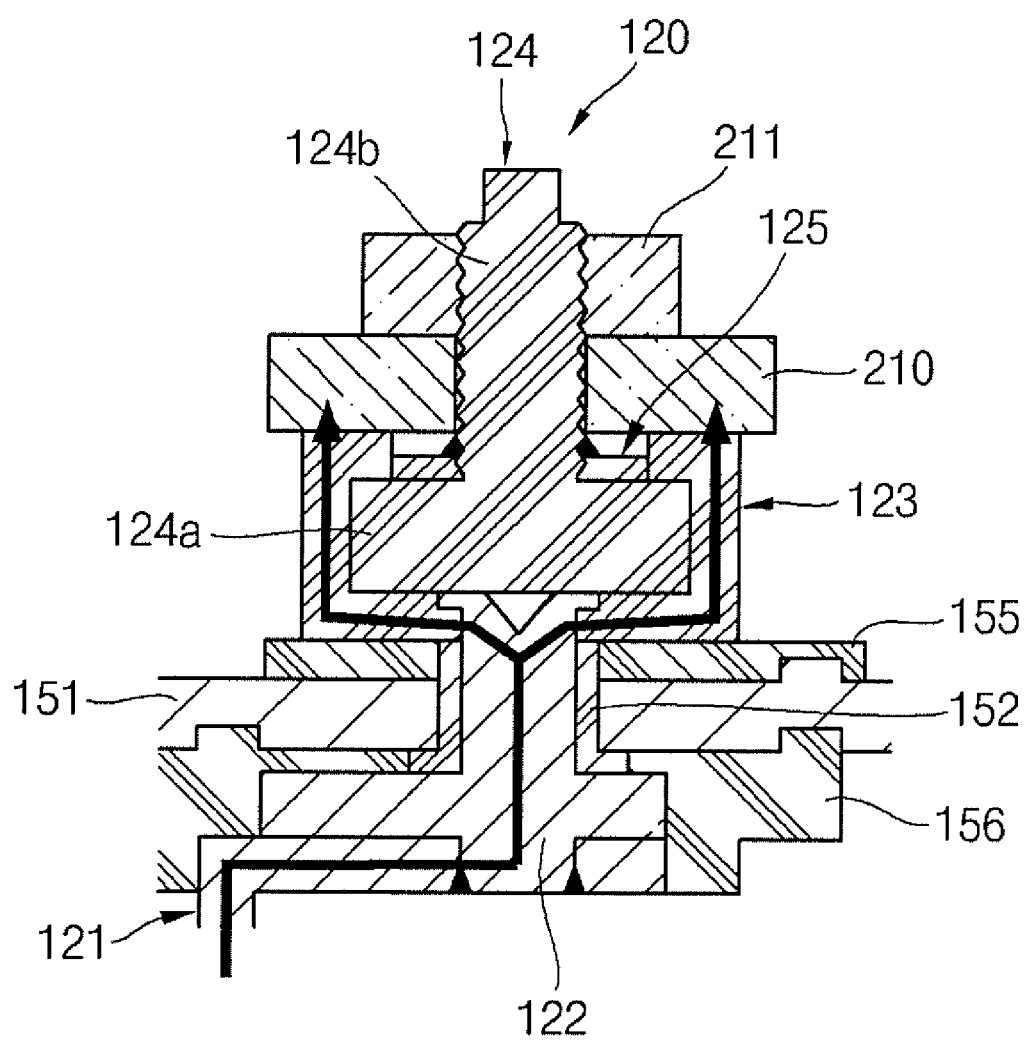
FIG. 6 is a cross-sectional view illustrating a bus bar that is coupled to a rechargeable battery according to an embodiment of the present invention.

FIG. 6 is a cross-sectional view illustrating a bus bar that is coupled to a rechargeable battery according to an embodiment of the present invention.

As shown in FIG. 6, the bus bar 210 is coupled to the coupling terminal 124. That is, bolt portion 124b of the coupling terminal 124 is coupled to the throughhole 210d of the bus bar 210. In addition, a nut 211 is coupled to the bolt portion 124b corresponding to an upper portion of the bus bar 210, thereby allowing the bus bar 210 to be firmly adhered to the lower fixing member 123. For example, the lower fixing member 123 and the upper fixing member 125 may have different heights. Further, in some embodiments, the lower fixing member 123 may be taller (that is, have a higher height) than the upper fixing member 125.

Therefore, since the lower fixing member 123 having a relatively large sectional area is interposed between the collector terminal 122 and the bus bar 210 (for example, the contact area of the bus bar 210 and the first fixing member 123 may be larger than the contact area between the collector terminal 122 and the first fixing member 123), a current path therebetween is increased and contact resistance therebetween is reduced accordingly.

In addition, the nut 211 may be tightened in the bolt portion 124b with a relatively large torque. That is, even if a strong torque is applied to the nut 211, the collector terminal 122 is not adversely affected. In other words, when a strong torque is applied to the nut 211, the strong torque is transferred only to the coupling terminal 124. However, the strong torque applied to the coupling terminal 124 is not transferred to the collector terminal 122. Therefore, the nut 211 can be tightened with a stronger torque than in the conventional case. Accordingly, an assembling strength between the bus bar 210 and each of the terminals 120 and 130 can be enhanced, and resistance against vibration and impact can be increased.

Although the terminal of a rechargeable battery and a method of manufacturing the same of the present invention have been described with reference to certain exemplary embodiments thereof, it will be understood by those skilled in the art that a variety of modifications and variations may be made to the present invention without departing from the spirit or scope of the present invention defined in the appended claims, and their equivalents.

DESCRIPTION OF CERTAIN SYMBOLS IN THE DRAWINGS

| | |
|---|---|
| 100: Rechargeable battery | 110: Electrode assembly |
| 120: First terminal | 121: First collector plate |
| 122: First collector terminal | 123: First lower fixing member |
| 124: First coupling terminal | 125: First upper fixing member |
| 130: Second terminal | 131: Second collector plate |
| 132: Second collector terminal | 133: Second lower fixing member |
| 134: Second coupling terminal | 135: Second upper fixing member |
| 140: Case | 150: Cap assembly |
| 151: Cap plate | 152: Seal gasket |
| 153: Plug | 154: Safety vent |
| 155: Upper insulation member | 156: Lower insulation member |

What is claimed is:

1. A battery terminal of a rechargeable battery, the battery terminal comprising:
a collector terminal electrically coupled to an electrode assembly in a case of the rechargeable battery;
a first fixing member electrically and mechanically coupled to the collector terminal;
a coupling terminal mechanically coupled to the first fixing member; and
a second fixing member mechanically coupled to the coupling terminal, wherein
the first fixing member has a first through-hole allowing a portion of the collector terminal to pass through,
the second fixing member has a second through-hole allowing a portion of the coupling terminal to pass through,
the first fixing member comprises:
a first planar portion having the first through-hole;
first extending portions extending away from opposite sides of the first planar portion with the first through-hole therebetween; and
second extending portions corresponding to and extending away from the first extending portions and towards each other with the first through-hole therebetween, and
the first planar portion, the first extending portions, and the second extending portions together define a first channel.

2. The battery terminal of claim 1, wherein the coupling terminal comprises:
a body coupled to the first channel; and
a bolt portion extending away from the body.

3. The battery terminal of claim 2, wherein
the second fixing member comprises:
a second planar portion having the second through-hole; and
third extending portions extending away from opposite sides of the second planar portion with the second through-hole therebetween, and
the second planar portion and the third extending portions together define a second channel.

4. The battery terminal of claim 3, wherein the body is coupled to the second channel, and
enclosed and secured in a space formed by the first channel and the second channel when the body is coupled to the first channel and to the second channel.

5. The battery terminal of claim 4, wherein the third extending portions are adjacent to corresponding opposite side surfaces of the first planar portion when the body is coupled to the first channel and to the second channel.

6. The battery terminal of claim 4, wherein the first extending portions and the third extending portions are coupled to four sides of the body when the body is coupled to the first channel and to the second channel.

7. A battery terminal of a rechargeable battery, the battery terminal comprising:
a collector terminal electrically coupled to an electrode assembly in a case of the rechargeable battery;
a first fixing member electrically and mechanically coupled to the collector terminal;
a coupling terminal mechanically coupled to the first fixing member; and
a second fixing member mechanically coupled to the coupling terminal, wherein
the first fixing member has a first through-hole allowing a portion of the collector terminal to pass through,
the second fixing member has a second through-hole allowing a portion of the coupling terminal to pass through,
the second fixing member comprises:
a planar portion having the second through-hole; and
extending portions extending away from opposite sides of the planar portion with the second through-hole therebetween, and
the planar portion and the extending portions together define a channel.

8. The battery terminal of claim 7, wherein the coupling terminal comprises:
a body coupled to the channel, and
a bolt portion extending away from the body.

9. The battery terminal of claim 8, wherein the bolt portion is welded to the planar portion.

* * * * *